Nov. 4, 1958 C. C. MORRISON 2,859,085
COLD CREAM JARS
Filed Aug. 10, 1953
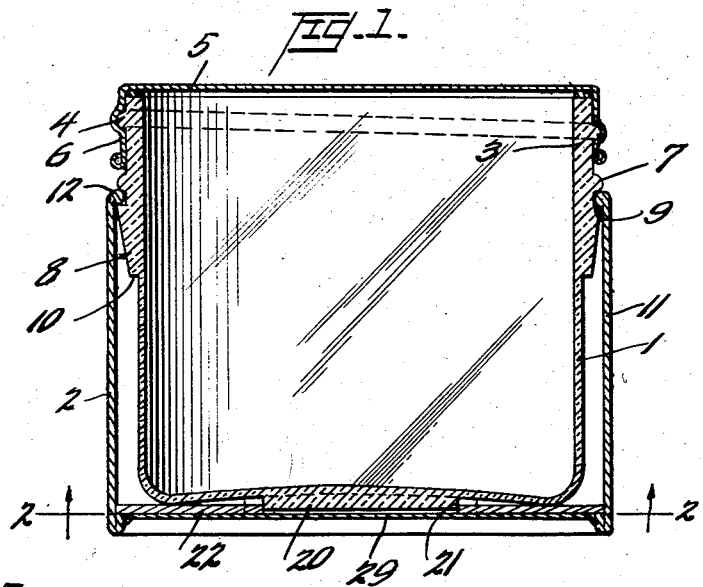
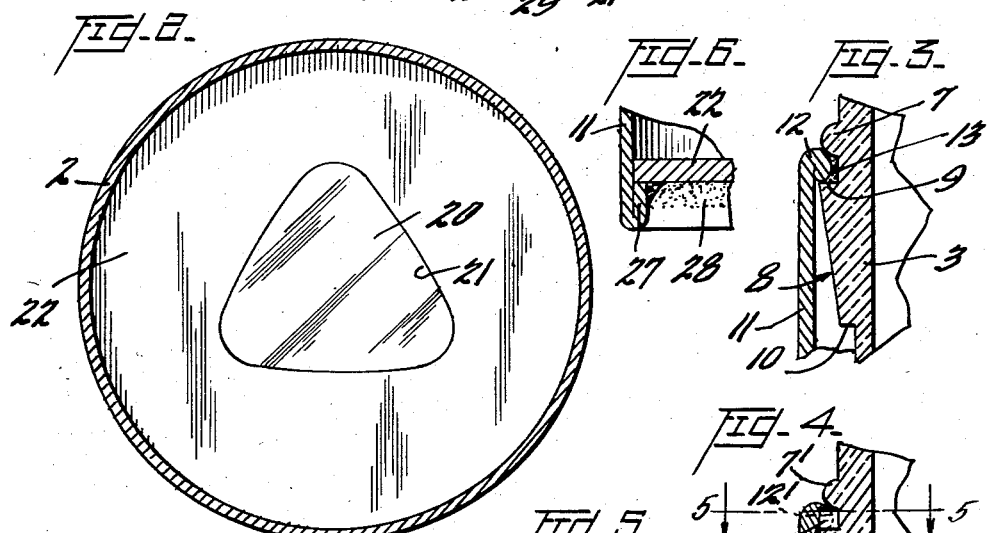
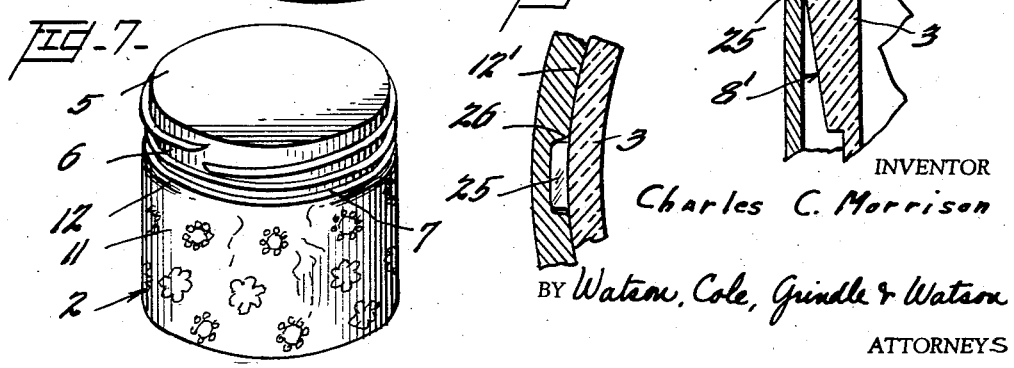
INVENTOR
Charles C. Morrison
BY Watson, Cole, Grindle & Watson
ATTORNEYS

United States Patent Office 2,859,085
Patented Nov. 4, 1958

2,859,085

COLD CREAM JARS

Charles Chambers Morrison, Shelter Island, N. Y., assignor to F. N. Burt Company, Inc., Buffalo, N. Y., a corporation of Delaware Application August 10, 1953, Serial No. 373,279

1 Claim. (Cl. 215—12)

This invention relates to containers for facial creams, cream lotions, and other semi-fluid materials and is similar in subject matter to that covered by my Patent 2,413,726 for "Cold Cream Jar" granted January 7, 1947, on an application filed October 23, 1944.

In my prior patent I disclosed a container of the class mentioned in which an inner receptacle of glass or other similar relatively fragile material was protected and supported in an outer casing formed of relatively strong cushioning material, such as cardboard, fiiberboard and the like. The inner receptacle was more or less permanently retained in the outer casing by means of a plurality of wedge-shaped nibs formed integrally with the receptacle and spaced circumferentially therearound, so that when the inner receptacle was assembled with the outer casing in telescoping fashion, the nibs became slightly imbedded or wedged into the inner surface of the casing.

While this construction proved to be generally adequate for normal usage, in certain instances it was noted that the engagement obtained between the nibs and the inner surface of the casing was not sufficient to prevent relative rotation of the receptacle within the casing, as for example, where the lid of the receptacle had become "frozen" thereon and an abnormally large amount of force was required to remove the lid.

Furthermore, it was found that the relatively small size and precise shape of the nibs materially increased the cost of the mould or die in which the inner receptacle was formed and added substantially to the price at which my containers could be made available to the consuming public.

An additional disadvantage of my prior construction is that the small size of the wedge shaped nibs made them subject to being broken off from the remainder of the receptacle during the production and assembly of the elements of the container which either rendered the receptacle unfit for use or reduced the strength of the connection between it and the outer casing.

It is therefore an object of this invention to provide a container for cosmetics and the like consisting of an inner receptacle and an outer casing formed with cooperating parts for presenting relative rotation therebetween even when an excessively large amount of force is applied thereto tending to rotate the same.

A further object of this invention is to provide a container for cosmetics and the like consisting of an inner receptacle and an outer casing furnished with cooperating parts for maintaining the receptacle and casing in assembled position, which parts are not excessively liable to breakage during production and handling of the elements of the container.

Another object of this invention is to provide a container which can be produced and made available to the public at minimum expense.

Other and further objects and advantages will appear as the description of the invention proceeds when read in connection with the accompanying drawings, in which—

Figure 1 is an elevational view in section of one embodiment of the container of the present invention, showing the inner receptacle and outer casing in assembled relationship;

Figure 2 is a view along lines 2—2 of Figure 1;

Figure 3 is an enlarged view showing the details of the mating parts of the inner receptacle and outer casing which maintains the two in their assembled relationship;

Figure 4 is an enlarged view similar to Figure 3 of a modified form of retaining means;

Figure 5 is a view along line 5—5 of Figure 4;

Figure 6 is an enlarged view showing the details of the joint between the side and bottom walls of the outer casing; and Figure 7 is a view in perspective on a smaller scale of the assembled and ornamented container.

Referring now to Figures 1–3 for a detailed description of the illustrative embodiment of the invention there shown, the improved container comprises an inner receptacle 1 and an outer protected and supporting casing 2. In the assembly of the container, the inner receptacle 1 is telescopically received in the outer casing 2 by which it is supported and retained in its normal operative position. While the container has been illustrated as being of circular cross-sectional configuration when viewed transversely to its axis, it will be understood that it may be formed in any desired shape, such as rectangular, polygonal, oval, etc.

As disclosed in my prior patent, the inner receptacle is constructed of a material that is substantially impervious to the substance to be contained thereby, such as glass, certain of the well known plastics, and the like, flint glass being particularly satisfactory by reason of its low cost. On the other hand, fibrous materials, such as cardboard, paperboard, fiberboard and the like are preferably utilized in making the outer casing 2 by reason of the fact that these materials possess the necessary strength to adequately support the inner receptacle and yet are sufficiently resilient to cushion the relatively fragile inner receptacle and protect the same from breakage. The materials employed in the manufacture of my container should be selected with a view to their adaptability for mass production by means of automatic machinery and, in addition, the nature of the material intended for use in the construction of the casing should be such that it will substantially retain a given size and shape so as to be able to receive the inner receptacle in close relation, and to form a tight pressure fit when assembled in the operative position shown in Figure 2.

The upper portion of the inner receptacle 1 is preferably thickened slightly over the main lower body portion of the receptacle, as at 3, and provided with an inclined external thread or bead 4 for the reception of a lid or closure 5 having a depending skirt 6 threaded to engage the thread 4 of neck 3. The cap 5 may be made of any desired material, such as metal, paper, plastic or the like.

As can be best seen in Figures 1 and 3, the thickened portion 3 of the inner receptacle 1 at a point slightly below the thread 4 is formed with an outwardly directed bead 7 which extends around the entire circumference of receptacle 1 and spaced below the bead 7 is an annular enlargement, generally indicated at 8, which, in this embodiment, also extends entirely around the receptacle circumference. The enlargement 8 has an upper shoulder 9 which with the lower portion of the bead 7 defines a groove, for purposes as will hereinafter appear. The peripheral surface of the enlargement 8 is inclined downwardly and inwardly from shoulder 9 and terminates in a lower shoulder 10. Formed on the extreme upper edge of the side wall 11 of casing 2 is an inwardly directed lip or bead 12 which when the receptacle 1 and casing 2 are in assembled relationship seats in or interlocks with the groove defined by bead 7 and upper shoulder 9 to retain receptacle 1 within casing 2. Preferably a small amount of a suitable adhesive 13 is deposited in the groove to cause lip 12 to adhere thereto and provide a tight strong connection between the casing and receptacle. The function of the lower shoulder 9 is to permit the inner receptacle to be grasped by tongs and the like in order that it may be handled and conveyed from place to place during the moulding and assembling operations.

I have found it desirable for the casing 2 to have an internal diameter as the lip 12 which is somewhat less than the maximum external diameter of the receptacle 1, i. e., the diameter measured at shoulder 9, or, in other words, the internal diameter of the casing at the lip should be very slightly greater than the external diameter of the receptacle at the bottom of the groove defined by upper shoulder 9 and bead 7. Also, the receptacle diameter at the lower shoulder 10 should substantially correspond to that at the bottom of the groove. Accordingly, when the receptacle and casing are assembled by telescoping the two together, the casing lip will clear lower shoulder 10 and move up the outwardly inclined surface of enlargement 8, being expanded slightly thereby, and, once past the edge of shoulder 9, will snap into the groove between shoulder 9 and bead 7, affording virtually a permanent connection between the receptacle and casing.

While relative rotation of the receptacle within the casing would, of course, be resisted by the adherence of lip 12 in the groove, it is highly desirable to provide additional anti-rotation means which would more positively resist relative rotation of these two parts. To this end, in the embodiment illustrated in Figures 1 and 2, the bottom of the inner receptacle 2 is formed with a downwardly projecting protuberance or boss 20 of irregular shape, as for example, polygonal, which mates with a correspondingly shaped recess or aperture 21 in the bottom wall or floor 22 of casing 2. It will be apparent that the engagement of the irregular shaped protuberance 20 with the side walls of the recess 21 will prevent relative rotation of the casing and receptacle even where the forces tending to rotate the same are quite large in magnitude.

In the modified form of the invention, depicted in Figures 4 and 5, the anti-rotation arrangement just described is dispensed with and the anti-rotation feature is obtained by means of a novel design of the bead and groove structure at the top of the container. In accordance with this design, at spaced intervals around its periphery the enlargement 8' is provided with an extension 25 which projects substantially up to the bead 7', thus dividing the groove into a series of circumferentially spaced slots and the lip 12' is correspondingly cut away, as at 26, to mate with the extensions 25. By virtue of the mating engagement of the extensions 25 with the cut-away lip portions 26 relative rotational movement between the receptacle and casing will be prohibited.

The details of the manner in which the bottom wall 22 is secured to the side wall 11 of the casing may be observed in Figure 6. The extreme lower portion of side wall 11 is reversely bent or folded back upon itself, as at 27, to provide a shoulder against which the peripheral portion of the bottom wall 22 rests and the parts are glued in this position by means of a ring or bead of adhesive 28. In cases where an opening is employed in the bottom wall with which the protuberance 20 mates, it is desirable to utilize a bottom closure plate 29, formed from a thin sheet of metal, stiff cardboard or other deformable material, and having its dimensions slightly larger than the internal dimensions of the casing side wall measured between the reversely bent lower portion thereof. The closure plate is pressed into the recess at the bottom of the casing formed by reversely bending the lower edges of the casing side wall and will be retained in this position by frictional engagement of its peripheral edges with the inner face of the reversely bent portions of the side wall.

From the aforegoing description, it will be seen that I have provided an improved container including a frangible inner receptacle adapted to be filled with creamy, semi-liquid or liquid substances which is supported and partially enveloped by an outer casing, the receptacle and casing being constructed with cooperating parts for fixedly retaining them in assembled relationship and for preventing relative rotation therebetween. The casing, being made of relatively strong, resilient fibrous material, cushions and protects the frangible receptacle against damage or breakage due to shocks, jars, or blows as the result of droppage, rough handling and the like. Furthermore, the fibrous nature of the casing causes it to be readily adaptable to decorative surface ornamentation, as by painting, printing, lithographing and so forth. Thus, as can be appreciated from Figure 7, my assembled container when suitably ornamented is highly attractive and pleasing to the eye and, from the standpoint of appealing to the aesthetic sense of the user, is quite capable of competing with the jars and containers costing many times as much to produce.

It will be obvious to those skilled in the art that my improved container is susceptible to considerable variation in design and detail and, for that reason, I do not choose to be limited to the specific embodiments illustrated and described but only by the spirit and scope of the claim hereunto appended.

Having thus described my invention, that which is claimed is:

A container including, in combination, an inner receptacle of frangible material; a supporting and protecting casing of slightly elastic material adapted to telescopingly receive and enclose a major portion of said receptacle and support and protect the same; mating parts on said receptacle and casing cooperating to prevent relative rotation of one with respect to the other; an outwardly projecting part integral with said receptacle and extending circumferentially therearound, being spaced from the upper and lower extremities thereof, said part having an upper and lower shoulder thereon and an upwardly and outwardly inclined surface extending from the lower shoulder to the upper shoulder; an outwardly directed bead on said receptacle spaced upwardly from said upper shoulder and defining a groove therewith; and an inwardly directed bead at the upper end of said casing, the internal diameter of said casing at said bead being approximately equal to the internal diameter of the receptacle measured at the bottom of said groove and less than the external diameter of the receptacle measured at the extreme upper end of said inclined surface while the internal diameter of the casing throughout the remainder of its height is approximately equal to the external diameter of said receptacle at the upper end of said surface whereby said bead is adapted to seat in said groove when said receptacle and casing are assembled, said inclined surface at points spaced circumferentially around the receptacle being extended upwardly to said bead to divide said groove into a number of segments and said inwardly directed casing bead being cut away at correspondingly spaced points around the casing, said extensions and said cutaway bead portions constituting mating parts cooperating to prevent relative rotation between the casing and receptacle.

References Cited in the file of this patent

UNITED STATES PATENTS

| | | |
|---|---|---|
| 254,947 | Fisher | Mar. 14, 1882 |
| 260,470 | Fisher | July 4, 1882 |
| 891,878 | Thatcher | June 30, 1908 |
| 1,147,421 | Morewood | July 20, 1915 |
| 1,944,920 | Bramsen | Jan. 30, 1934 |
| 2,076,549 | Conner | Apr. 13, 1937 |
| 2,076,551 | Conner | Apr. 13, 1937 |
| 2,077,215 | Conner | Apr. 13, 1937 |
| 2,196,486 | Anderson | Apr. 9, 1940 |
| 2,413,726 | Morrison | Jan. 7, 1947 |
| 2,533,349 | Burger | Dec. 12, 1950 |
| 2,568,284 | Harrison | Sept. 18, 1951 |